United States Patent
Chan et al.

(10) Patent No.: US 7,375,935 B2
(45) Date of Patent: May 20, 2008

(54) GROUND FAULT CIRCUIT INTERRUPTER WITH ENHANCED RADIO FREQUENCY INTERFERENCE SUPPRESSION

(75) Inventors: David Y. Chan, Bellerose, NY (US); Eugene Shafir, Jamaica Estates, NY (US); John Libretto, N. Massapequa, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 19 days.

(21) Appl. No.: 11/095,581

(22) Filed: Apr. 1, 2005

(65) Prior Publication Data

US 2006/0018061 A1 Jan. 26, 2006

Related U.S. Application Data

(60) Provisional application No. 60/561,413, filed on Apr. 12, 2004.

(51) Int. Cl.
*H02H 3/00* (2006.01)
(52) U.S. Cl. ...................................... 361/42
(58) Field of Classification Search ............... 361/42
See application file for complete search history.

(56) References Cited

U.S. PATENT DOCUMENTS 3,845,403 A * 10/1974 Heckman, Jr. ............... 330/305
3,961,263 A * 6/1976 George ..................... 455/180.2
3,989,988 A * 11/1976 Puetz et al. ................. 361/302
4,148,003 A * 4/1979 Colburn et al. ............. 333/181
5,969,921 A * 10/1999 Wafer et al. .................. 361/45
6,424,234 B1 * 7/2002 Stevenson .................... 333/182
2002/0181175 A1* 12/2002 Baldwin ....................... 361/42
2003/0081370 A1* 5/2003 Haskell et al. ............. 361/306.1

* cited by examiner

*Primary Examiner*—Michael Sherry
*Assistant Examiner*—Ann Hoang
(74) *Attorney, Agent, or Firm*—Paul J. Sutton

(57) ABSTRACT

A ground fault circuit interrupter device having a feedthrough capacitor for substantially reducing interference from radio frequency signals such as those emitted from cell phones and 2-way radios. The ground fault circuit interrupter device includes a printed circuit board having a system ground terminal and a detection terminal for receiving a fault detection signal. A chip is provided having a ground pin connected to the system ground terminal and an input pin for receiving the fault detection signal. The feedthrough capacitor has a through conductor connected between the input pin and the detection terminal and a capacitor coupled between the through conductor and the system ground terminal.

6 Claims, 2 Drawing Sheets

GROUND FAULT CIRCUIT INTERRUPTER WITH ENHANCED RADIO FREQUENCY INTERFERENCE SUPPRESSION

This application claims the benefit of the filing date of a provisional application having Ser. No. 60/561,413 which was filed on Apr. 12, 2004.

BACKGROUND OF THE INVENTION

1. Field of the Invention

This invention relates generally to ground fault circuit interrupters (GFCI's) and more specifically to a GFCI having reduced sensitivity to interference caused by radio frequency signals.

2. Description of the Related Art

Present day GFCI circuits include by-pass capacitors, inductive chokes, and noise filters on signal lines and sensitive parts of the circuitry to the direct current (DC) Ground terminal to suppress interference caused by radio frequencies. While the components that are currently being used are adequate for radio frequency signals used in the past, they are not fully effective for signals in the spectrum of radio frequencies which are now being used. For example, cell phones use signals having frequencies which can interfere with the operation of a GFCI by not only causing nuisance tripping of the GFCI, but can also cause a GFCI to fail by subjecting one or more of the components in the GFCI to excessive stress. What is needed is GFCI circuitry for reducing interference caused by radio frequencies.

SUMMARY OF THE INVENTION

The present invention solves the above noted problems by providing a GFCI device with a feedthrough capacitor to substantially suppress interference caused by radio frequency signals such as those generated by cell phones.

In one embodiment of the invention, the GFCI device includes a printed circuit board having a system ground terminal and a detection terminal for receiving a fault detection signal. A chip is provided having a ground pin connected to the system ground terminal and an input pin for receiving the fault detection signal. A feedthrough capacitor is provided having a through conductor connected between the input pin and the detection terminal and a capacitor coupled between the through conductor and the system ground terminal. The feedthrough capacitor substantially reduces interference from radio frequency signals such as those emitted from cell phones.

In other embodiments, a feedthrough capacitor can be connected to other locations of the circuitry of GFCI device to further reduce interference from radio frequency signals. For example, the through conductor of the feedthrough capacitor can be connected to the input or output of a chip having ground fault interrupting functions, the gate terminal of a semiconductor switch, the power supply terminal of the printed circuit board holding the circuitry.

The present invention provides one or more of the following advantages. The arrangement of the feedthrough capacitor reduces unwanted radio frequency signals by shunting or filtering the signals with respect to the system ground terminal GND thereby reducing interference from such signals. As a result, nuisance tripping of the GFCI may be reduced. In addition, the components of the GFCI may be subjected to less stress which would have been caused from such signals thereby improving the performance of the GFCI.

The foregoing has outlined, rather broadly, the preferred feature of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention and that such other structures do not depart from the spirit and scope of the invention in its broadest form.

BRIEF DESCRIPTION OF THE DRAWINGS

Other aspects, features and advantages of the present invention will become more fully apparent from the following detailed description, the appended claim, and the accompanying drawings in which similar elements are given similar reference numerals:

DETAILED DESCRIPTION OF THE INVENTION

The present invention discloses GFCI circuitry having a feedthrough capacitor connected in close proximately to the circuitry at sensitive locations for substantially reducing interference from radio frequency signals such as those emitted from cell phones.

Figure 1:
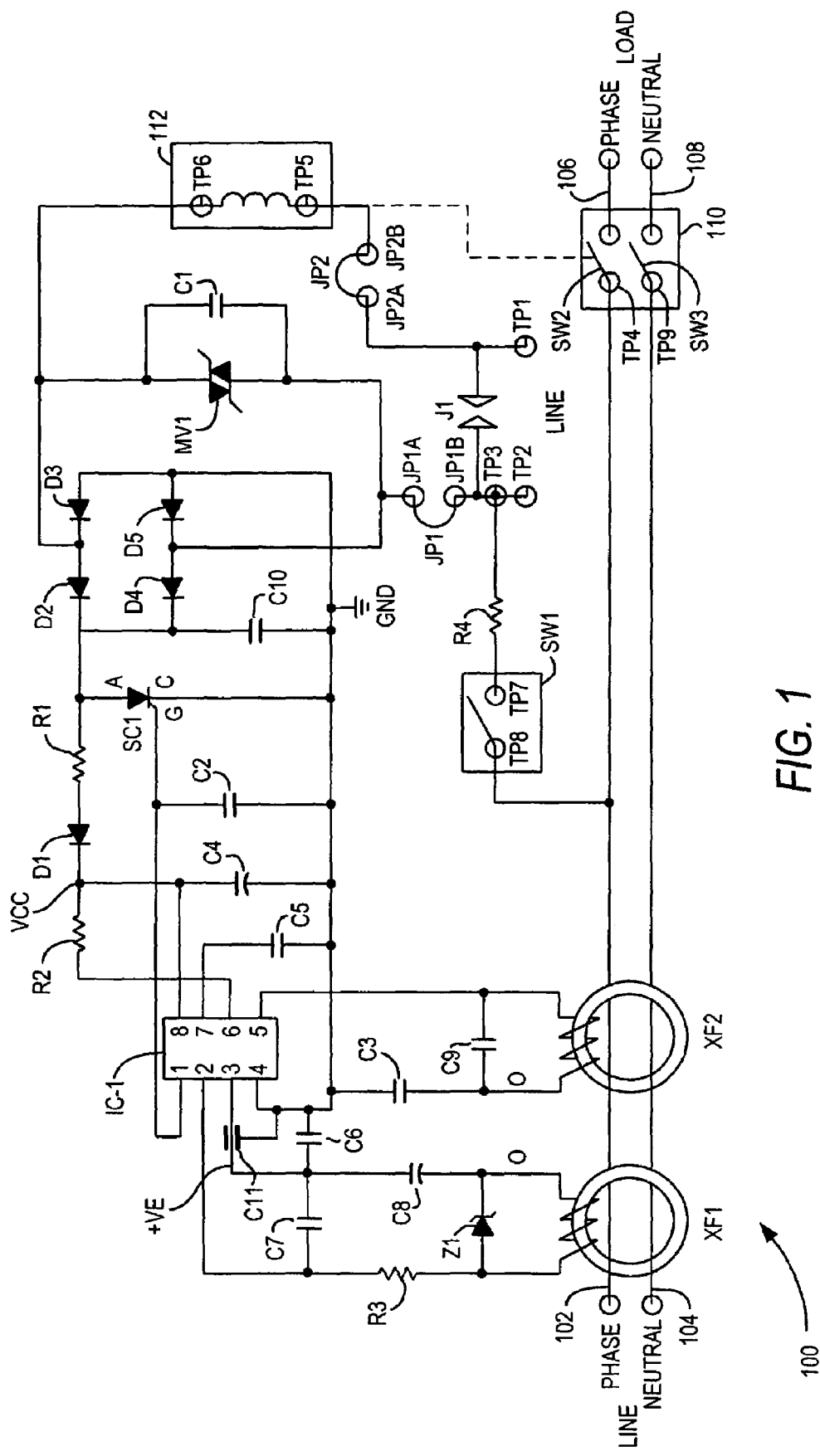
FIG. 1 is a schematic wiring diagram of a GFCI device according to an embodiment of the invention.

Referring to FIG. 1, there is shown a schematic wiring diagram of GFCI circuitry 100 for detecting a predetermined fault condition such as a ground fault and disconnecting the input terminals from the output terminals in response thereto. The circuitry 100 has a feedthrough capacitor C11 for substantially reducing interference from radio frequency signals such as those emitted from cell phones. The circuitry 100 includes a printed circuit board (not shown) with a direct current (DC) system ground terminal (GND) and a detection terminal (+VE) for receiving a fault detection signal from a differential transformer XF1. The system ground terminal GND is connected to the ground pin 4 of a chip IC-1 that performs fault detection functions. The feedthrough capacitor C11 has a through conductor connected between the input pin 3 of IC-1 and the detection terminal +VE and has a capacitor coupled between the through conductor and the system ground terminal GND. The input pin 3 is internally coupled to the non-inverting input of an operational amplifier (not shown) within IC-1 which is typically configured for handling a ground fault condition.

In one embodiment, the capacitor C11 has attenuation characteristics that increase at 20 dB per decade from its cutoff frequency to at least that frequency where it exhibits a minimum attenuation of 60 dB and maintains this attenuation at higher frequencies. The cutoff frequency of the feedthrough capacitor can be selected from a band of frequencies in the 1 to 300,000 megahertz band of the radio spectrum. There are presently two frequency bands for cellular service centered on approximately 850 and 1850 MHz. The cutoff frequency of the feedthrough capacitor also can be selected from a range of frequencies in the 850 megahertz band, 1850 megahertz band or other bands for cell phone service. The frequency characteristics of the feedthrough capacitor C11 along with the proximate placement of the capacitor to the circuitry at sensitive locations help reduce interference from radio frequency signals such as those emitted from cell phones.

The GFCI circuitry 100 includes a sensing circuit for detecting a predetermined condition such as a ground fault. The sensing circuit comprises a differential transformer XF1 and a ground/neutral (G/N) transformer XF2 each of which can comprise a magnetic core having a coil winding with two ends. The differential transformer XF1 is used for detecting a current imbalance on the line terminals 102, 104. The G/N transformer XF2 is used for detecting a remote ground voltage that may be present on one of the load terminals 106, 108. The first end of the differential transformer XF1 is connected to the input pin 2 of IC-1 through series resistor R3 and the second end of the transformer XF1 is connected to input pin 3 of IC-1 through the through conductor of the feedthrough capacitor C11. Filter capacitor C8 is placed in series with the second end of transformer XF1 and the capacitor C11 for filtering unwanted signals. Filter capacitor C7 is placed across pin 2 of IC-1 and the first conductor of feedthrough capacitor C11 to filter unwanted signals. Filter capacitor C6 is placed across the through conductor of capacitor C11 and the system ground terminal GND for reducing unwanted signals. A zener diode Z1 is placed across the transformer XF1 to limit any potential overvoltage surges across the transformer XF1. It should be noted that input pin 2 is internally connected to the inverting input of an operational amplifier (not shown) in IC-1 and input pin 3 is internally connected to the non-inverting input of the operational amplifier. The first end of the transformer XF2 is connected to the output pin 5 of IC-1 and the second end of the transformer XF2 is connected to the system ground terminal GND through a filter capacitor C3 for filtering unwanted signals. It should be noted that pin 5 is the output from the internal sense amplifier (not shown) of IC-1. A filter capacitor C9 is placed across the first and second ends of the transformer XF2 for reducing unwanted signals.

Chip IC-1 can be one of the integrated circuits typically used in ground fault circuits, for example LM-1851, manufactured by National Semiconductor or other well known semiconductor manufacturers. IC-1 has an output pin 1 connected to the gate terminal of a semiconductor switch device SC1 for trigging the switch in response to a fault detection signal received by IC-1. A filter capacitor C2 is connected across pin 1 of IC-1 and the system ground terminal GND for reducing unwanted signals. A filter capacitor C4 is connected across the power supply terminal VCC and the system ground terminal GND for reducing unwanted signals. A timing capacitor C5 is connected across pin 7 of IC-1 and the system ground terminal GND for setting the timing of IC-1. Resistor R2 is connected across pins 6 and 8 of IC-1 for setting the sensitivity of IC-1. The cathode of diode D1 is connected to the power supply terminal VCC and the anode of the diode is connected to the anode of switch SC1 through resistor R1. Diode D1 performs a rectification function providing the power supply voltage at the VCC terminal for powering IC-1 and the other components. Diode D1 also helps prevent capacitor C10 from "bleeding" when switch device SC1 is turned on (when capacitor C10 discharges, chip IC-1 would not operate properly). The cathode terminal of the switch SC1 is connected to the system ground terminal GND and the anode terminal is connected to the DC side of a full wave bridge comprising diodes D2-D5. A filter capacitor C10 is connected across the anode and cathode terminals of switch SC1 for reducing unwanted signals. Although the switch SC1 is shown as a silicon controlled rectifier (SCR) other semiconductor or mechanical switches can be used.

Chip IC-1 is configured for detecting a current from the transformers in response to a ground fault and generating a signal causing a relay assembly to connect/disconnect power received at the input line terminals (102, 104) from any loads connected to the device via the output load terminals (106, 108). The relay assembly comprises a coil 112 and relay contacts 110, shown as a pair of switches SW2, SW3, to connect the line terminals 102, 104 to respective load terminals 106, 108. The line terminals 102, 104 and load terminals 106, 108 are electrically isolated from each other unless connected by the switches SW2, SW3. A switch assembly comprising a switch SW1 in series with current limiting resistor R4 is coupled between line terminal 102 and one end of the relay coil 112 (through jumper J1 being connected and providing an electrical path) for manually generating a fault condition. A surge suppressor MV1 is coupled across the AC portion of the full wave bridge comprising diodes D2-D5 for absorbing extreme electrical energy levels that may be present at the line terminals 102, 104. A filter capacitor C1 is coupled across the surge suppressor MV1 for filtering out unwanted signals.

The circuitry 100 includes test points and jumpers for various purposes such as testing the functionality of the circuitry. For example, test points TP1-TP9 are terminals which facilitate testing the circuitry of the GFCI 100 by providing a means for taking measurements, such as voltage levels, using test equipment such as a voltage meter. Jumper elements or connectors are employed for providing a means of selecting certain features of the GFCI 100. For example, jumper element JP1 (for connection across terminals JP1A, JP1B) can be used to connect/disconnect an electrical path between the surge suppressor MV1 and the line terminal 102. Likewise, jumper element JP2 (for connection across terminals JP2A, JP2B) and header terminal J1 can be used to connect/disconnect an electrical path between relay coil 112 and the line terminal 102. Although not shown, for proper operation, a connector is placed across the terminal J1 for providing a complete electrical path between the line terminal 102 and the relay coil 112.

Further suppression of interference signals can be obtained by placing the first through conductor of the feedthrough capacitor C11 in close proximity to the input or output of an operational amplifier (not shown) which can be in chip IC-1, the gate terminal of semiconductor switch SC1, and the power supply terminal VCC on the printed circuit board. The layout and location of components on the printed circuit board is also important in reducing interference. The system ground terminal GND should have a large conductor width and include a ground loop. The distance between critical components should be kept to a minimum. In addition, filter capacitors should be positioned as close as possible to the circuitry 100.

In operation, with regard to unwanted radio frequency signals, the feedthough capacitor C11 shunts or filters the signals with respect to the system ground terminal GND thereby reducing interference from such signals. As a result, nuisance tripping of the GFCI is reduced. In addition, the components of the GFCI are subjected to less stress which would have been caused from such signals thereby improving the performance of the GFCI.

During a ground fault condition, a current provided by the differential transformer XF1, chip IC-1 generates a voltage on pin 1 which triggers the gate terminal of switch SC1. The full wave bridge comprising diodes D2-D5 has a DC side which is connected to the anode of SC1. SC1 is turned on, allowing current to flow through the DC side of the full wave bridge activating relay coil 112 causing the relay switches SW2, SW3 to open thereby removing power from the load terminals 106, 108. The relay coil 112 can also be activated when mechanical switch SW1 is closed which causes a current imbalance on the line terminal conductors that is detected by the differential transformer XF1. The G/N transformer XF2 detects a remote ground voltage that may be present on one of the load terminals and provides a signal (current or voltage) to IC-1 upon detection of this remote ground which again activates relay coil 112. Thus, the sensing circuit engages a circuit interrupting portion of the GFCI device causing the device to be tripped. In the tripped condition the line terminals and the load terminals are electrically isolated from each other.

Figure 2:
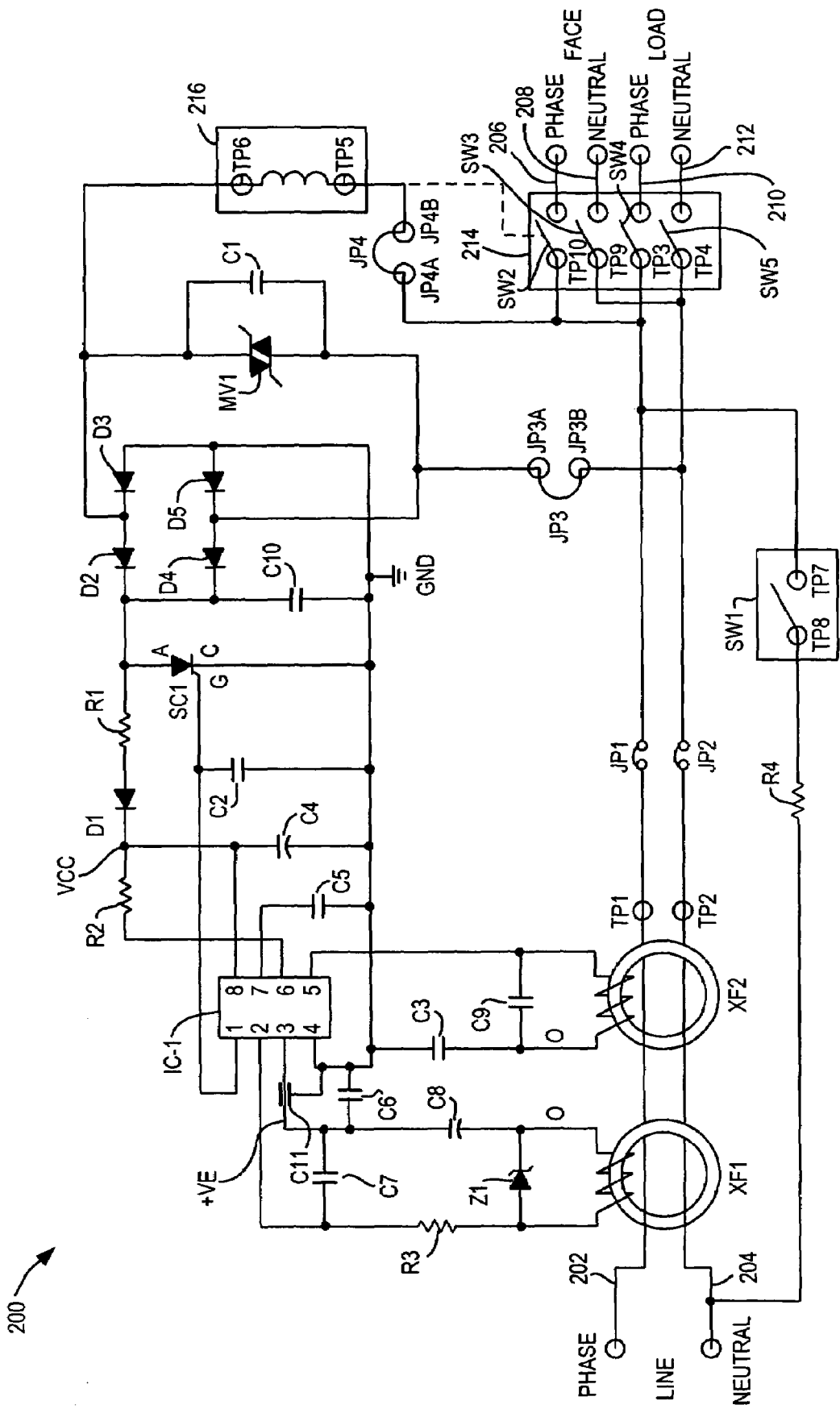
FIG. 2 is a schematic wiring diagram of a GFCI device according to another embodiment of the invention.

Referring to FIG. 2, there is shown a feedthrough capacitor C11 connected to another embodiment of a GFCI circuit 200. The placement of the feedthrough capacitor C11 in GFCI circuit 200 is similar to the placement of the feedthrough capacitor C11 in GFCI circuit 100 of FIG. 1. Like GFCI 100, the input of the GFCI 200 is connected to line terminals (phase terminal 202 and neutral terminal 204) and load terminals (phase terminal 210 and neutral terminal 212). However, GFCI 200 is also connected to face terminals (phase terminal 206 and neutral terminal 208). In one embodiment, the GFCI is part of a wiring device such as a receptacle and the line terminals are connected to a cable providing a source of power, the load terminals are connected to another power cable which in turn is connected to a load, and the face terminals are provided on the face of the receptacle for receiving a plug with a cable as part of a load. In addition, to accommodate the face terminals, GFCI 200 has a relay coil 216 coupled to relay contacts 214 comprising a movable bridge assembly with face switches and load switches. The face switches SW2, SW3 are connected between the line terminals 202, 204 and the face terminals 206, 208. The load switches SW4, SW5 are connected between the line terminals 202, 204 and the load terminals 210, 212.

The operation of the GFCI circuit 200 is similar to the operation of the GFCI circuit 100 of FIG. 1. For example, in response to a current or potential provided by the differential transformer XF1, chip IC-1 generates a voltage on pin 1 turning on SC1 and activating relay coil 216. The activation of relay coil 216 causes the relay face switches SW2, SW3 to remove power from the face terminals 206, 208 and the relay load switches SW4, SW5 to remove power from the load terminals 210, 212. Likewise, the G/N transformer XF2 detects a fault condition and provides a current to IC-1 which activates relay coil 216 causing the movable bridge assembly 214 to remove power from the face terminals and the load terminals as described above. Test points TP1-TP10 and jumper elements JP1-JP4 provide various functions such as a means for testing the circuitry of the GFCI 200.

It should be noted that although the present invention is described in the context of a GFCI, the techniques of the present invention are equally applicable to other circuit interrupting devices and systems such as arc fault circuit interrupters (AFCI's), immersion detection circuit interrupters (IDCI's), appliance leakage circuit interrupters (ALCI's) and equipment leakage circuit interrupters (ELCI's). Exemplary values for the components of GFCI 100 and 200 of the present invention include: Resistors R1 (15K, 2 W), R2-R3 (⅛W), R4 (15K), capacitors C1 (0.01 uF, 400V), C2-C3 (0.01 uF, 50V), C4 (1 uF, 50V), C5 (0.018 uF, 100V, 10%), C6 (100 pF, 50V), C7 (0.0033 uF, 50V), C8 (10 uF, 5.3V), C9 (100 pF, 50V), C10 (680 pF, 1000V), zener diode Z1 (4.7V) and surge suppressor MV1 is a metal oxide varistor (MOV) rated at 210V.

While there have been shown and described and pointed out the fundamental novel features of the invention as applied to the preferred embodiments, it will be understood that various omissions and substitutions and changes of the form and details of the method and apparatus illustrated and in the operation may be done by those skilled in the art, without departing from the spirit of the invention.

What is claimed is:

1. A circuit interrupting device comprising:
   a housing;
   a phase conductive path and a neutral conductive path each disposed at least partially within said housing between a line side and a load side, said phase conductive path terminating at a first connection capable of being electrically connected to a source of electricity, a second connection capable of conducting electricity to at least one load and a third connection capable of conducting electricity to at least one user accessible load, and said neutral conductive path terminating at a first connection capable of being electrically connected to a source of electricity, a second connection capable of providing a neutral connection to said at least one load and a third connection capable of providing a neutral connection to said at least one user accessible load;
   a first differential transformer coupled to said phase conductive path and said neutral conductive path for detecting a phase to ground fault and generating a phase to ground fault signal in a secondary winding having a first end and a second end;
   a second differential transformer coupled to said phase and neutral conductive paths for detecting a neutral to ground fault and generating a neutral to ground fault signal in a secondary winding having a first end and a second end;
   a circuit interrupting portion disposed within said housing and configured to cause electrical discontinuity in said phase and neutral conductive paths between said line side and said load side;
   said circuit interrupting device further comprises a chip having a ground pin (4) connected to a system ground terminal and to the second end of said secondary winding of said second differential transformer, a pair of input pins (2,3) coupled to the first end and the second end respectively of said secondary winding of said first differential transformer, and an output pin (5) coupled to the first end of said secondary winding of said second differential transformer; and
   a feedthrough capacitor having
      (i) a through conductor disposed in the interior of the feedthrough capacitor, the through conductor connected between the second end of said secondary winding of said first differential transformer and the input pin (3) coupled thereto, and
      (ii) a capacitor coupled between said through conductor and said ground pin (4),
   wherein said feedthrough capacitor effectively reduces interference from radio frequency signals.

2. The circuit interrupting device of claim 1 wherein said input pins are connected to inputs of an operational amplifier.

3. The circuit interrupting device of claim 1 wherein the feedthrough capacitor has attenuation characteristics that increase at approximately 20 decibels per decade from its cutoff frequency.

4. The circuit interrupting device of claim 1 wherein the feedthrough capacitor has a cutoff frequency selected from a band of frequencies between 1 to 300,000 megahertz.

5. The circuit interrupting device of claim 1 wherein the feedthrough capacitor has a cutoff frequency selected from a range of frequencies in the radio band for cell phone service.

6. The circuit interrupting device of claim 1 wherein the feedthrough capacitor has a cutoff frequency selected from a range of frequencies in the 1850 megahertz band for cell phone service.

* * * * *